June 15, 1965     T. J. DOLPHIN ETAL     3,189,804

STRIP REEL INERTIA COMPENSATION CONTROL SYSTEM

Filed Dec. 22, 1960     3 Sheets-Sheet 1

WITNESSES

INVENTORS
Thomas J. Dolphin and
David M. Hawkins
BY
ATTORNEY

United States Patent Office 3,189,804
Patented June 15, 1965

3,189,804
STRIP REEL INERTIA COMPENSATION CONTROL SYSTEM
Thomas J. Dolphin, Clarence, and David M. Hawkins, Tonawanda, N.Y., assignors to Westinghouse Electric Corporation, East Pittsburgh, Pa., a corporation of Pennsylvania
Filed Dec. 22, 1960, Ser. No. 77,593
8 Claims. (Cl. 318—6)

In general this invention relates to an inertia compensation control system utilized to control a strip winding and reeling operation during acceleration and deceleration.

More particularly, it relates to an inertia compensation computer which utilizes static circuitry to compute the inertia compensation required during acceleration and deceleration periods on a current regulated strip reel drive in order to hold substantially constant tension on the reel. In the past it has been necessary to apply inertia compensation signals for a predetermined linear acceleration rate. However, the present invention utilizes an inertia compensation signal that is directly proportional to the instantaneous rate of change of strip speed. This makes it possible to have a non-linear acceleration or deceleration rate and still obtain the correct inertia compensation signal.

It is the general object of this invention to provide a simpler and improved inertia compensation computer for regulated reel drives.

Another object is to provide an improved inertia compensation computer utilizing only static elements.

Another object of this invention is to provide an improved inertia compensation system for reel motor drives which will compute the necessary inertia compensation for various coil diameters and strip widths.

Another object of this invention is to provide a simpler and improved inertia compensation system for reel motor drives which multiplies a signal, that is a function of field flux, coil diameter and strip width at a given constant strip acceleration, times the instantaneous actual strip acceleration to obtain an accurate inertia compensation signal to control the reel motor.

Another object of this invention is to provide an improved inertia compensation control system for a reel motor drive wherein anticipatory signals can be introduced at the initiation and termination of the accelerating and decelerating periods to compensate for any time delay of the current regulator.

Another object of this invention is to provide an improved inertia compensation computer for a reel motor drive which can be adjusted to match the exact inertia compensation curve for any reel.

The aforesaid objects of the invention and other objects which will become apparent as the description proceeds are achieved by providing a static function generator which can be matched to any reel and is dependent on strip width. The curve for inertia compensation is at a given constant acceleration and the input signal to the static function generator may be either a signal proportional to the field flux of the reel motor or to the diameter of the coil. The output signal of the static function generator is multiplied by means of pulse width modulation times the instantaneous acceleration or deceleration rate of the strip. This final output signal is utilized to control the reel motor. Anticipatory signals can be introduced at the initiation and termination of the accelerating and decelerating periods to compensate for any time delay of the reel motor control. This is particularly useful at the initiation of acceleration when additional reel current may be needed for breakaway of the reel system.

For a better understanding of the invention reference should be had to the accompanying drawings, wherein.

Figure 1:
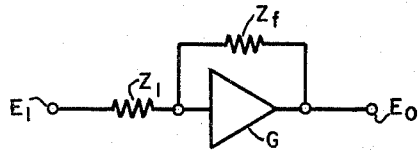
FIGURE 1 is a diagrammatic showing of a well known operational amplifier used in the present invention.

FIGURE 1 shows a well known operational amplifier used in the present invention. The term operational amplifier is generally applied to a high gain D.C. amplifier used to perform mathematical operations including calculus by means of passive inputs and feedback networks. The following is a brief review of operational amplifier usage:

In FIGURE 1 the input voltage $E_1$ is fed through an input impedance $Z_1$. This input voltage $E_1$ is fed to a high negative gain D.C. amplifier G which has a feedback impedance $Z_f$ and the output of the amplifier G is $E_0$. In a recent publication, "Electronic Analog Computers" by A. Korn and T. M. Korn, 1952, McGraw-Hill Book Company, at page 148, it was shown that if the gain G is very large (1) $$\frac{E_0}{E_1} = \frac{-Z_f}{Z_1}$$

The ratio $E_0/E_1$ is dependent only on the passive impedances $Z_f$ and $Z_1$.

Figure 2:
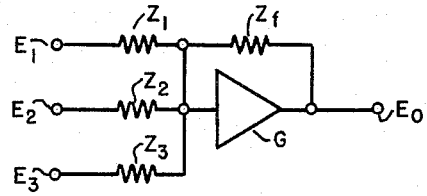
FIG. 2 is a diagrammatic showing of a well known summing amplifier used in the present invention.

FIGURE 2 shows a summing amplifier, and it can be shown from the above publication that if G is very large (2) $$E_0 = -E_1\left(\frac{Z_f}{Z_1}\right) - E_2\left(\frac{Z_f}{Z_2}\right) - E_3\left(\frac{Z_f}{Z_3}\right)$$

Using standard analog computer techniques, many operations can be accurately performed with an operational amplifier. For example, in FIGURE 1 if $Z_f$ represents a capacitor C and $Z_1$ represents a resistor R, (3) $$\frac{E_0}{E_1} = \frac{-1}{RC_p}$$

and the operational amplifier becomes an integrator with a gain of $$\frac{1}{RC}$$

Similarly if $Z_f$ is replaced by a resistor $R_f$ and $Z_1$ is replaced by a resistor $R_1$ the operational amplifier provides an accurate gain (4) $$\frac{E_0}{E_1} = \frac{-R_f}{R_1}$$

Many other operations are possible including differentiation, time delay and function generation using operational amplifiers.

The foregoing relationships are obtained by making the amplifier gain G very high. This requirement is met by using a high gain D.C. amplifier.

Figure 3:
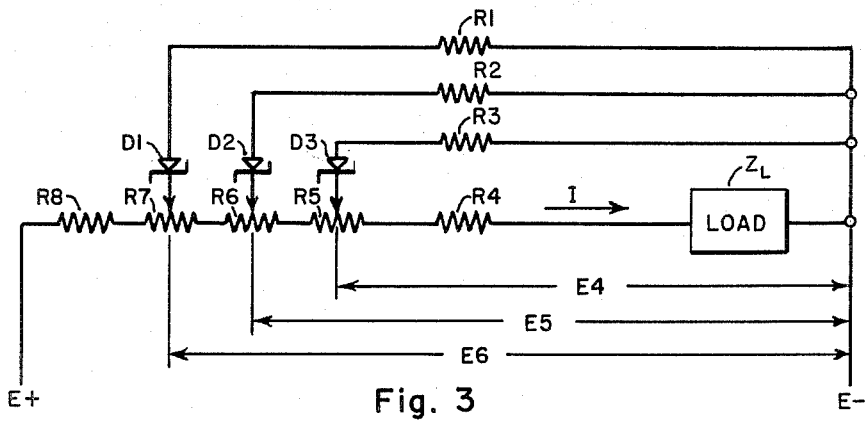
FIG. 3 is a schematic diagram of one well known type of ramp function generator.

FIGURE 3 shows a static ramp function generator of the type used in the present invention. The purpose of this device is to provide a means of duplicating the electrical characteristics of an electrical machine for regulating purposes. The generator shown has an input voltage applied across the terminals E+ and E−. Variable resistance R8, R7, R6, R5, R4 and load impedance $Z_L$ are in series with each other and the input voltage source. A first Zener diode D1 and resistance R1 is placed in parallel with a portion of resistance R7 and the resistances R6, R5, R4 and load impedance $Z_L$. A second Zener diode D2 and its accompanying resistance R2 are placed in parallel with a portion of resistance R6 and resistances R5, R4 and load impedance $Z_L$. A third Zener diode D3 and its accompanying resistance R3 are placed in parallel with a portion of resistance R5, resistance R4 and load impedance $Z_L$.

Figure 4:
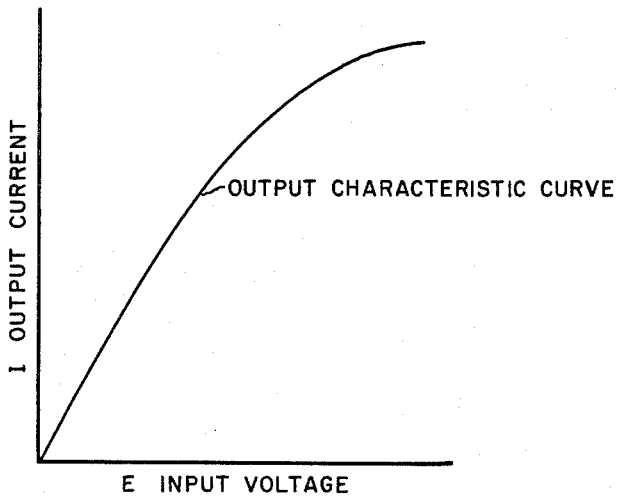
FIG. 4 is a curve of input voltage versus output current for a ramp function generator such as is shown in FIG. 3.

The operation of this system is as follows: A voltage is applied across E+, E−. The current I in the load impedance $Z_L$ is proportional to this voltage until the voltage E6 is applied across the first Zener diode D1 circuit. At voltage E6 the Zener diode D1 breaks down to permit current to flow through resistor R1. This action causes current in the load impedance $Z_L$ not to be proportional to the voltage applied at E+ and E−. As the applied voltage is increased the current through R1 is directly proportional to the voltage above E6. When the voltage E+ and E− reaches the value E5, Zener diode D2 breaks down to shunt current through resistor R2. The same occurs to resistor R3 after voltage E4 is reached. As each Zener diode breaks down, the resulting current I attains the characteristic shown in FIGURE 4. The shape of this curve may be varied in any way desired by simply rearranging the resistors and Zener diodes and changing their values.

Figure 5:
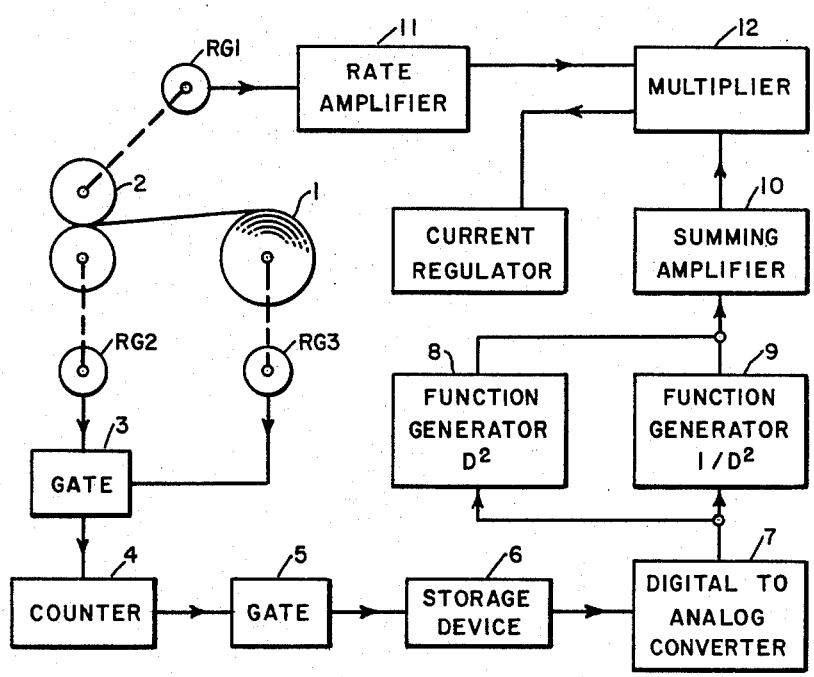
FIG. 5 is a diagrammatic showing of the control system of the present invention utilizing a coil diameter signal.
Figure 6:
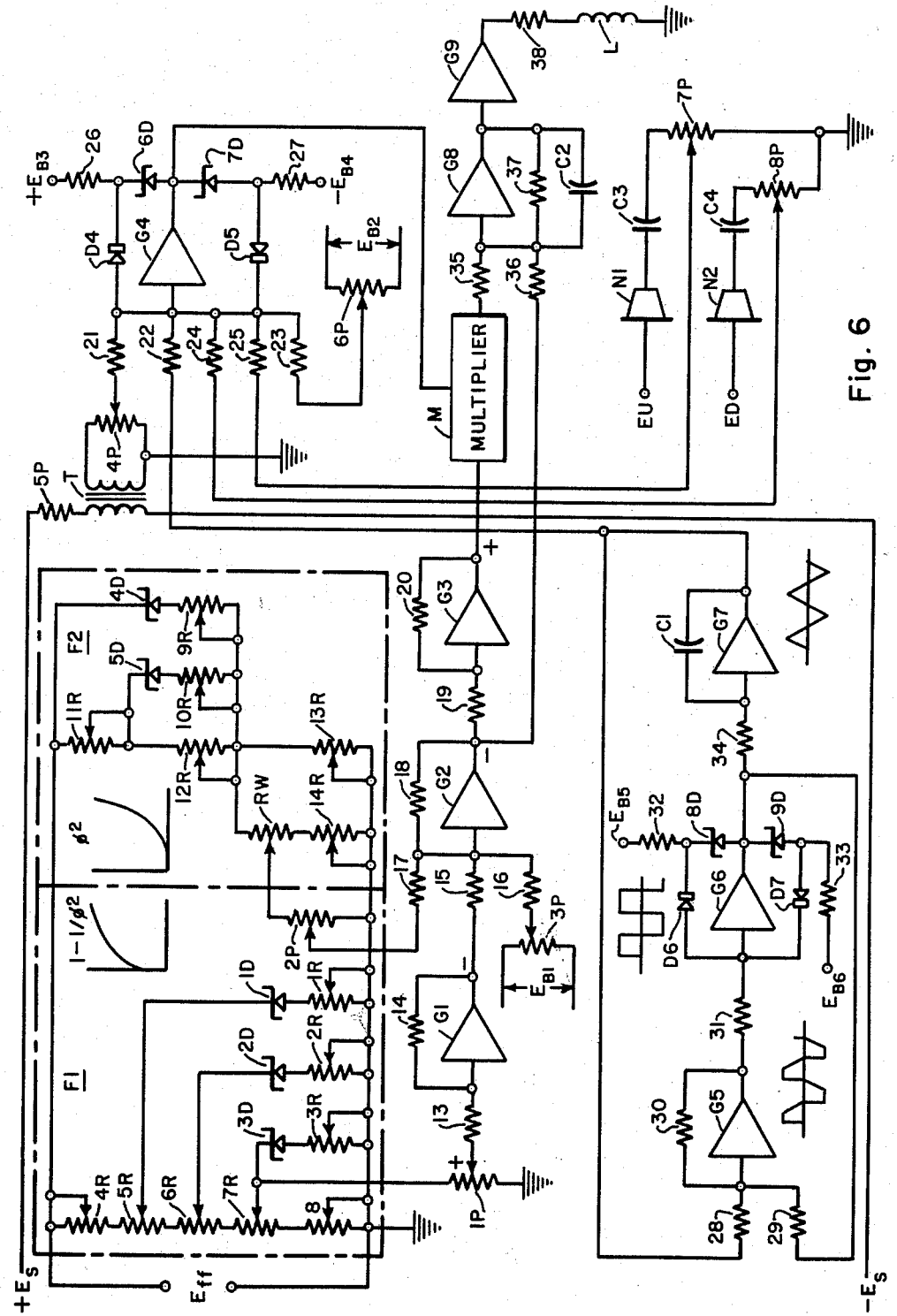
FIG. 6 is a diagrammatic showing of the control system of the present invention using a field flux signal.

The inertia compensation computer of the present invention is shown in FIGS. 5 and 6. This computer performs two main functions. The first function is to generate a signal proportional to the inertia compensation required for some nominal constant accelerating rate for various coil diameters from minimum coil to maximum and for various strip widths. This signal is then multiplied by a signal that is proportional to the instantaneous accelerating rate giving an output signal that is correct for any change in strip speed.

The first function is accomplished by generating a familiar U-shaped curve of inertia compensation versus coil diameter or field flux. This curve is actually made up of two components, the first of which is a measure of the inertia compensation required to accelerate the fixed inertia of the reel, which is inversely proportional to the coil diameter squared, and the second component is the inertia compensation required to accelerate the variable inertia of the coil and which component is proportional to the coil diameter squared. Both of these components are generated from a signal which is proportional to the coil diameter. This may be obtained from a signal which senses directly the coil diameter or, as the field flux is proportional to the coil diameter, it may be obtained from a counter E.M.F. regulator. The curve component for the fixed inertia is maximum for a minimum coil diameter. This is shown as curve C in FIGURE 7. The curve component for the variable inertia is minimum for a minimum coil diameter. This is shown as curve D of FIGURE 7. The addition of curve C and curve D is the normal inertia compensation curve for a given normal acceleration shown in FIGURE 7 as curve E.

FIGURE 5 describes how one embodiment of the invention may be applied to a regulated strip reel motor drive system. The strip on the reel 1 is fed through rolls 2. In order to maintain constant tension in this strip it is necessary to have the reel motor field flux proportional to the winding reel coil diameter. It would be convenient therefore to have an accurate measurement of the coil diameter which is isolated from the current and speed limit regulators of the reel motor. This is accomplished by the use of pulse generators on the mill rolls 2 and the reel 1 respectively. The peripheral speed of the mill roll can be represented as $wd$ where $w$ is the rotational speed of the rolls in radians per second and $d$ is the diameter of the roll in feet. The peripheral speed of the coil must equal that of the mill roll and can be represented as $wcdc$ where $wc$ is the rotational speed of the coil and $dc$ is the diameter of the coil. Since $wd$ equals $wcdc$, then $dc$ equals $$\frac{wd}{wc}$$

The rotational speed of the roll $w$ is measured by the pulse tachometer RG2 and the rotational speed of the coil $wc$ is measured by the pulse tachometer RG3. The pulse train from the pulse tachometer RG2 is counted in the counter 4 and the counter 4 is gated on and off in gate 3 by pulses from the reel pulse generator RG3. The count received from the gate 3 in the counter 4 will be proportional to the diameter of the coil. The gate 5 transfers this count into the storage device 6 and clears and resets the counter 4 for the next reading. The output of gate 5 is stored in the storage device 6 before being applied to a digital to analog converter 7. Thus we have a counter that counts the pulses from the mill for each revolution of the reel. Knowing the number of pulses per foot of strip generated by the mill pulse generator RG2 will provide a direct reading of the diameter of the coil. It is therefore possible to measure the diameter of the coil every revolution or even fraction of revolution. This information is stored and decoded into an analog signal proportional to diameter. This diameter signal is fed into the function generators 8 and 9, where the function generator 8 gives an output which is equal to the square of the diameter and function generator 9 gives an output which is equal to the inverse of the square of the diameter. The function generator 8 develops the signal proportional to the torque necessary to accelerate the fixed inertia of the reel motor armature, gears, brakes, shaft and mandrel. The function generator 9 develops a signal proportional to the torque necessary to accelerate the coil whatever its diameter or width may be.

Since the motor speed is reduced with increase in diameter the torque required to accelerate the fixed inertia varies inversely with the square of the diameter. However, the torque required to accelerate the coil varies directly with the square of the diameter.

These signals are added in a summing amplifier 10. A pilot generator RG1 is used to obtain a signal proportional to the speed of the strip. This signal is fed into a rate amplifier 11 whose output is proportional to the change in the speed of the strip, or in other words the acceleration of the strip. This signal, proportional to the acceleration of the strip, is multiplied by the output of the summing amplifier 10 in a multiplier 12 to obtain the inertia compensation signal needed to supply a current regulator used to control the reel motor. By this method the correct value of inertia compensation is available at all time regardless of whether speed changes are initiated by mill operators or by automatic control features.

FIG. 6 is another embodiment of the present invention. A voltage $E_{ff}$ which is proportional to the field flux signal, and may be obtained from the counter E.M.F. regulator, is applied to function generators F1 and F2. The signal $E_{ff}$ may be the diameter signal shown in FIGURE 5. The static function generator F1 utilizes resistors 1R, 2R, 3R, 4R, 5R, 6R, 7R and 8R, and Zener diodes 1D, 2D and 3D to generate the function $$1 - \frac{1}{\phi^2}$$

This function $$1 - \frac{1}{\phi^2}$$

is obtained across a first potentiometer 1P and fed through an input resistor 13 to an operational amplifier G1 having a feedback resistance 14. This amplifier circuit inverts the sign of the function $$1 - \frac{1}{\phi^2}$$

A bias potential $Eb1$ is fed from a potentiometer 3P through an input resistor 16 to a second operational amplifier G2 having a resistor 18 as its feedback impedance.

Since the function $$1 - \frac{1}{\phi^2}$$

is fed to a second input resistor 15 of the operational amplifier G2 it subtracts from the bias signal $Eb1$ to become $$1 - 1 + \frac{1}{\phi^2} \text{ or } \frac{1}{\phi^2}$$

Figure 7:
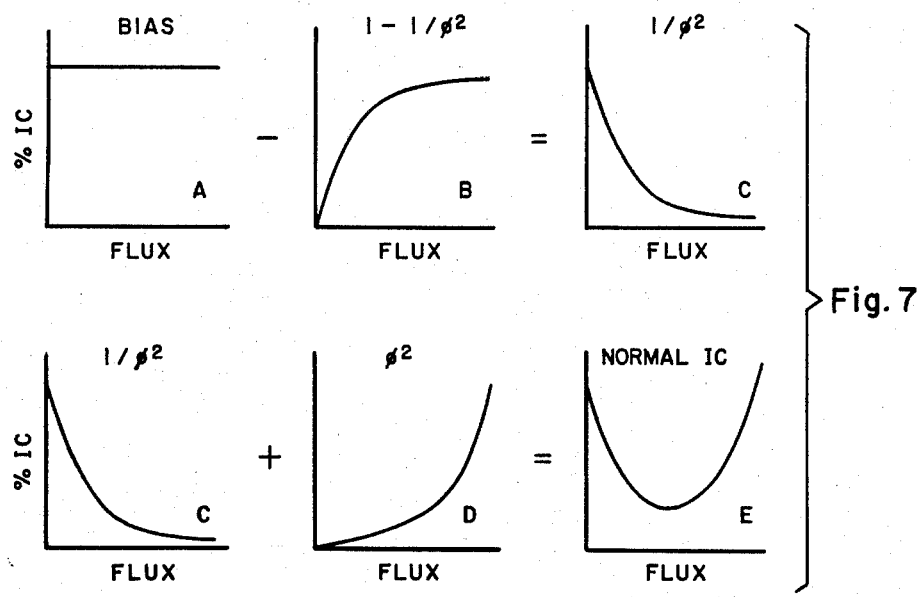
FIG. 7 is a group of curves which explain more fully the operation of the control system of FIG. 6.

This is shown in FIGURE 7 as curve A—curve B=curve C. This gives you the fixed inertia compensation curve for the system, which is inversely proportional to the flux squared.

A second static function generator F2 generates the function $\phi^2$ and includes resistances 9R, 10R, 11R, 12R, 13R and 14R, and Zener diodes 4D and 5D. A resistance $Rw$ is utilized to adjust the output of the function generator F2 for various values of strip widths. Strip width is normally set by a mill operator with a small rheostat. A second potentiometer 2P feeds the output signal of the function generator F2 through an input resistor 17 to the operational amplifier G2. This adds to the signal proportional to $$\frac{1}{\phi^2}$$

or the fixed inertia signal, a signal equal to $\phi^2$, which is proportional to the variable inertia signal, so that the output of the second operational amplifier G2 is the percent of inertia compensation necessary for the system at a given flux or diameter and will be accurate for any value of strip width. Since the output of the second operational amplifier is negative it is fed through an input resistor 19 to a third operational amplifier G3 having a feedback resistor 20 to invert its sign before being fed to the multiplier. The output of operational amplifier G3 is the inertia compensation required for some nominal acceleration rate. This signal is then multiplied as described below by the acceleration rate to provide the desired inertia compensation signal. In practice it has been found desirable to utilize the maximum inertia compensation curve necessary as the nominal acceleration rate.

Multiplication of the computed nominal inertia compensation signal by the instantaneus acceleration rate is accomplished by pulse width modulation. The output of operational amplifier G3 is fed through a biased diode gate M into an averaging amplifier G8 with a gain of 2. The output of amplifier G2, which is the negative of the output of amplifier G3, is fed into the averaging amplifier G8 through a gain of 1. If the biased diode gate or multiplier M is conducting 50% of the time, the output of the multiplier M is cancelled by the output of amplifier G2 and the output of the averaging amplifier G8 is zero. This represents the condition when there is zero speed change, and the inertia compensation required is zero. When the mill is accelerating, the biased diode gate M is open for greater than 50% of the time, and a positive inertia compensation signal is obtained which is proportional to the time that the gate is open. For deceleration rates the biased diode gate M is opened less than 50% of the time and the output of the averaging amplifier G8 is negative and is proportional to the rate of deceleration.

The gate M is controlled in the following manner. Operational amplifier G4 is used as a voltage detector; that is, it is operated without feedback, although it does have voltage limiting Zener diodes 6D and 7D along with diodes D4 and D5 and is powered by supply voltages $Eb3$ and $Eb4$ through resistances 26 and 27 respectively. This voltage limiting Zener diodes 6D and 7D along with di- when the net input signal is greater than zero, and will saturate in the negative direction when the net input signal is less than zero. The connection is set so that the gate M is open on positive saturation, and closed on negative saturation.

Amplifiers G5, G6 and G7 form a triangular wave oscillator. Amplifier G5 is fed by a triangular wave signal from the output of amplifier G7 and a square wave signal from the output of amplifier G6. These are fed through input resistors 28 and 29 respectively to the amplifier G5 which has a feedback resistance 30 so as to add these two waves before feeding them through a resistance 31 to the voltage detector circuit including the amplifier G6. The voltage detector G6 which includes the amplifier G6 is similar to the voltage detector which includes the amplifier G4. This voltage detector includes operational amplifier G6, Zener diode 8D and 9D and diodes D6 and D7 and is powered by bias voltages $Eb5$ and $Eb6$ through resistances 32 and 33 respectively. The output square wave of the voltage detector is fed through an input resistance 34 to the operational amplifier G7 having a capacitor C1 as its feedback impedance. This integrates the square wave output of the voltage detector and forms a triangular wave output. This triangular wave is fed to the voltage detecting amplifier G4 through an input resistance 22. Since the triangular wave is symmetrical the voltage on the input of the voltage detector is positive for a half cycle and then negative for a half cycle so that biased diode gate M is open 50% of the time. By shifting the D.C. level on the input of the voltage detector, the gate will be opened or closed for a length of time proportional to the D.C. level. A signal $Es$ proportional to the speed of the strip and equivalent to the pilot generator RG1 voltage is transformed into a signal proportional to strip acceleration through the use of a rate transformer T. A capacitive circuit could be used to obtain this rate signal, however, the rate transformer has the advantage of isolating the transistor amplifiers from the pilot generator bus. The output of the rate transformer T is obtained from a potentiometer 4P and fed through a resistance 21 to the operational amplifier G4. Biased diode gate M is therefore open for a time greater than 50% if the pilot generator voltage $Es$ is rising and open for a time less than 50% if the pilot generator voltage $Es$ is being lowered. This in effect, multiplies the nominal inertia compensation signal by the acceleration rate, and the output of amplifier G8 and the power amplifier G9 is a bi-directional inertia compensation signal that is correct for various coil diameters, strip widths and acceleration rates. Amplifier G8 has a time delay to average the pulse width modulated signals from multiplier M and provide a D.C. output signal. This time delay is effected through the feedback impedances, capacitances C2 and resistor 37. The power amplifier G9 amplifies the output of amplifier G8 so that it can be effectively used when fed through the resistance 8 and control winding L of the reel motor current regulator.

A bias $Eb2$ may be fed through a potentiometer 6P to provide a zero adjustment for the voltage detector amplifier G4.

In addition to the circuit described above, which provides inertia compensation proportional to speed change, two additional anticipating signals may be introduced into the inertia compensation computer. These signals derive their intelligence from the logic initiating the speed change and provide a momentary corrective action in anticipation of the speed change. These anticipatory signals tend to compensate for any delay in the current regulator for the reel motor. These momentary signals are obtained from RC circuits which are fed from power NOR circuits.

A NOR circuit is one which will give an output signal when there is no input signal. Any other type of circuit which would provide this type of operation could be substituted for the NOR circuits utilized in the present invention. When the mill is not accelerating, the "up" input signal EU is "zero" and the "down" input signal ED is "one." At the start of acceleration the "up" input signal EU switches from a "zero" to a "one." This "up" input signal feeds a NOR circuit N1 which is connected to a capacitor C3 and a potentiometer 7P. When the "up" signal EU switches from "zero" to "one" the voltage across this RC circuit changes from a "one" or −24 volts to zero volts. This causes a discharge current to flow through resistor 7P to give a momentary positive signal to the voltage detector G4 to momentarily increase the inertia compensation signal. At the end of the acceleration period, signal EU changes from a "one" to a "zero" and the output of the power NOR changes from a "zero" to a "one" or −24 volts, and a charging current flows through resistor 7P to give a momentary decrease in the inertia compensation signal to prevent overshoot of the regulator. Signal ED operates in a similar manner through a power NOR into a capacitor C4 and a potentiometer 8P. The signal ED operates during deceleration periods. However, the sense is changed in order to provide a momentarily negative voltage to the voltage detector. The signal ED is normally "one," and when the mill decelerates the signal changes from a "one" to a "zero." This gives a −24 volts out of the power NOR and a charging current is initiated in a direction to give a negative signal to the voltage detector G4 and a momentary inertia compensation signal is obtained. At the end of deceleration the signal ED changes from a "zero" to a "one," and again a momentary signal is obtained, but the opposite polarity. The magnitude of these signals can be adjusted by adjusting potentiometers 7P and 8P.

Although the invention has been described with a certain degree of particularity it should be understood that the present disclosure has been made only by way of example and that numerous changes in the details of construction and the combination and arrangement of parts and elements may be resorted to without departing from the scope and spirit of the present invention.

We claim as our invention:

1. In control apparatus for a strip reeling system for achieving substantially constant strip tension between a pair of rolls driven by a first motor and a reel driven by a second motor, the combination of, signal generation means operative with each of said first and second motors and being capable of producing a first signal proportional to the inertia compensation required by the strip reeling system for a predetermined acceleration of the strip, strip speed detecting means for providing a second signal proportional to the actual acceleration of the strip, signal multiplying means for obtaining a resultant output signal in accordance with said first signal proportional to the inertia compensation times said second signal proportional to the actual acceleration of the strip, and motor control means for controlling at least one of said motors in accordance with the output signal of said signal multiplying means.

2. In control apparatus for a strip reel system for achieving constant tension in a strip passing between a pair of rolls and a strip reel driven by a motor, the combination of, signal providing means responsive to the operation of said pair of rolls and said reel and being capable of producing a first signal proportional to the predetermined inertia compensation necessary for said strip reel system for a given acceleration of the strip, strip movement detecting means for generating a second signal proportional to the actual acceleration of the strip, signal multiplying means for providing an output signal in accordance with the product of said first signal times said second signal, speed change control means operative to compensate said signal multiplying means momentarily for changes in said second signal, and motor control means for controlling said motor in accordance with the output signal of said multiplying means.

3. In control apparatus for a strip reeling system for achieving constant tension in the strip between the reel and a pair of rolls, said reel being driven by a motor, the combination of, signal providing means responsive to the operation of said motor and being capable of producing a first signal proportional to the predetermined inertia compensation necessary for the strip reeling system for a nominal acceleration of the strip, signal adjustment means for controlling said signal providing means in accordance with the width of said strip, strip speed detecting means for generating a second signal proportional to the actual acceleration of the strip, signal multiplying means for providing an output signal by multiplying said first signal times said second signal, and control means operative with said motor for controlling said motor in accordance with the output signal of said signal multiplying means.

4. In a strip tension control system for a motor driven coil strip reel system, including a pair of rolls driven by a first motor and a reel driven by a second motor, the combination of, first signal providing means responsive to the operation of at least one of said motors for providing a first signal proportional to the inertia compensation necessary for the system in accordance with the coil diameter of the strip on said reel for a given acceleration of the strip, strip speed sensing means for providing a second signal proportional to the actual acceleration of the strip, control signal means responsive to said first signal and said second signal for multiplying said first signal times said second signal to provide a control signal, and reel system control means for controlling at least one of said first and second motors in accordance with said control signal to maintain a substantially constant tension in the strip between said pair of rolls and said reel.

5. In control apparatus for achieving constant tension in a strip coil winding system, said system including a pair of rolls driven by a first motor and between which the strip passes to a strip winding reel driven by a second motor, the combination of, inertia compensation signal providing means responsive to the operation of both the first motor and the second motor for providing a first signal proportional to the inertia compensation necessary for the coil diameter of strip on said reel for a nominal acceleration of the strip, strip movement detecting means for generating a second signal proportional to the actual acceleration of the strip, control signal means responsive to said first and second signals for multiplying said first signal times said second signal to provide a control signal, and motor control means responsive to said control signal for controlling said second motor in accordance with said control signal.

6. In control apparatus operative with a strip reel system for providing a substantially constant strip tension between a pair of rolls driven by a first motor and a reel driven by a second motor, the combination of first signal providing means coupled to said first motor for providing a first signal in accordance with the operational speed of said rolls, second signal providing means coupled to said second motor for providing a second signal in accordance with the operational speed of said reel, signal generation means including a predetermined functional amplifier circuit operative with each of said first signal and said second signal for generating a first control signal proportional to the sum of the motor torque for accelerating the fixed inertia of the strip coil and the motor torque for accelerating the variable inertia of the strip coil required by the strip reel system for a predetermined speed change of the strip, third signal providing means coupled to said strip for providing a second control signal proportional to the actual speed change of said strip, signal multiplying means responsive to each of said first control signal and said second control signal for providing a resultant strip tension controlling output signal in accordance with the product of said first control signal times said second control signal, and motor control means including a motor current regulator for controlling said second motor driving said reel in accordance with said strip tension controlling output signal.

7. In strip reel control apparatus for providing a substantially constant strip tension between a pair of rolls driven by a first motor and a reel driven by a second motor for providing an energization of said second motor in accordance with the coil diameter of the strip wound on said reel, the combination of first signal providing means coupled to said first motor for providing a first speed signal in accordance with the rotational speed of said rolls, second signal providing means coupled to said second motor for providing a second speed signal in accordance with the rotational speed of said reel, signal storage means responsive to said first speed signal and said second speed signal for providing a coil diameter signal, first signal generation means including a predetermined function circuit operative with said coil diameter signal for providing a first control signal in accordance with the motor torque required to accelerate the fixed inertia of the reel, second signal generation means including a predetermined function circuit operative with said coil diameter signal for providing a second control signal in accordance with the motor torque required to accelerate the coil of the strip, signal summing means for adding together said first and second control signals, third signal providing means coupled to said strip for providing a third control signal proportional to the actual speed change of said strip, signal multiplying means responsive to each of said first control signal, said second control signal and said third control signal for providing a resultant inertia compensation output signal in accordance with the sum of said first control signal and said second control signal mulitplied by said third control signal, and motor control means including a motor current regulator for controlling said second motor driving said reel in accordance with said output signal.

8. In control apparatus for a strip coil winding system for regulating a substantially constant strip tension between a pair of rolls driven by a roll motor and a winding reel driven by a reel motor, the combination of first signal providing means coupled to said rolls for providing a first speed signal in accordance with the operational speed of said rolls, second signal providing means coupled to said winding reel for providing a second speed signal in accordance with the operational speed of said reel, strip coil signal generation means including predetermined functional amplifier circuits respectively operative with each of said first speed signal and said second speed signal for generating a first control signal proportional to the fixed inertia of said winding reel and a second control signal proportional to the variable inertia of said coil for a predetermined speed change of the strip, third signal providing means coupled to said strip for providing a third control signal proportional to the actual speed change of said strip, signal multiplying means responsive to the sum of said first control signal and said second control signal for providing a resultant strip tension controlling output signal in accordance with the product of said sum times said third control signal, and motor control means including a motor current regulator for controlling said reel motor in accordance with said strip tension controlling output signal.

References Cited by the Examiner
UNITED STATES PATENTS

| Re. 20,353 | 5/37 | Umansky | 318—7 X |
| 2,600,308 | 6/52 | Lund et al. | 318—158 |
| 2,697,807 | 12/54 | Pell | 318—7 |
| 2,858,493 | 10/58 | Hull et al. | 318—6 X |
| 2,917,689 | 12/59 | Abel | 318—6 |
| 2,943,809 | 7/60 | Garrett | 318—7 X |
| 3,018,978 | 1/62 | Graneau et al. | 318—6 X |
| 3,054,937 | 9/62 | Long | 318—154 X |

FOREIGN PATENTS

| 158,590 | 9/54 | Australia. |
| E9220 VIII | 3/56 | Germany. |
| 824,173 | 11/59 | Great Britain. |
| 353,436 | 4/61 | Switzerland. |

ORIS L. RADER, *Primary Examiner.*